Jan. 8, 1963　　　　　F. A. ALCARO　　　　　3,071,942
FLEXIBLE COUPLING AND METHOD OF MANUFACTURE
Filed Nov. 9, 1960

INVENTOR.
FRANCIS A. ALCARO
BY
Amster & Levy
ATTORNEYS

United States Patent Office 3,071,942
Patented Jan. 8, 1963

3,071,942
FLEXIBLE COUPLING AND METHOD OF MANUFACTURE
Francis A. Alcaro, 22 Buena Vista Road, Eastchester, N.Y.
Filed Nov. 9, 1960, Ser. No. 68,216
1 Claim. (Cl. 64—15)

This invention relates to a flexible coupling and more particularly to a precision manufactured flexible coupling especially designed for use in the most exacting applications.

The primary object of the present invention is to meet the need for a true precisioned instrument coupling, which, while permitting linear and angular misalignment without angular backlash, allows parallel hub displacement.

Further object of the present invention resides in the provision of a flexible instrument coupling which has very close concentricity between both hub bores thereof. This feature is of utmost importance in instrument couplings and in the past conventional couplings have failed to provide close concentricity between hub bores. When rotating over 360° an ordinary flexible coupling will alternately add and subtract its inherent eccentricity to the shaft misalignment and thereby create undesirable and excessive side thrusts. Oscillating forces such as these side thrusts cause vibrations, speed fluctuations, exert undue stresses on shafts, ball bearings, gearings and other rotating parts, thus destroying the intended precision and performance of the instrument while making high speed applications impossible.

The present invention overcomes the deficiencies of the prior art flexible couplings and is therefore adapted for very exacting applications such as missile control instrumentation.

In the past it has been noted that the radial thrust which causes undesirable stresses on shafts and other rotating components has been a function of the shaft misalignment, but has been dependent not by way of a direct proportion, but by way of an exponential relationship such as a hyperbolic curve whereby with an increment of shaft misalignment there is an increasingly greater amount of radial thrust. An unexpected advantage of this invention lies in the fact that the radial thrust of the flexible coupling is exceedingly small and is in direct proportion to the shaft misalignment. Thus, the present invention is adapted for use in connecting two shafts even when there are linear and angular misalignments without causing any undue wear on the parts being coupled.

A further object of the present invention resides in the provision of a flexible coupling that is in static and dynamic balance and which is free from noise and vibration since there are no moving or wearing parts. The present invention has extreme life expectancy and has optimum flexibility with no backlash.

In order to achieve high precision in the manufacturing of the flexible coupling, a novel process is employed wherein a tubular body is provided with a series of slots therein to form blades for the flexible coupling. In order to assure that there will be no distortion of the workpiece during the manufacture of the flexible coupling, a low melting point material is disposed in the slots which have already been cut in the body of the coupling while other slots are being cut whereby the workpiece is maintained against distortion.

These, together with the various ancillary objects and features of the present invention, which will become apparent as the following description proceeds, are attained by this flexible coupling and method of manufacture thereof, a preferred embodiment of the coupling being shown in the accompanying drawing, wherein.

Figure 1:
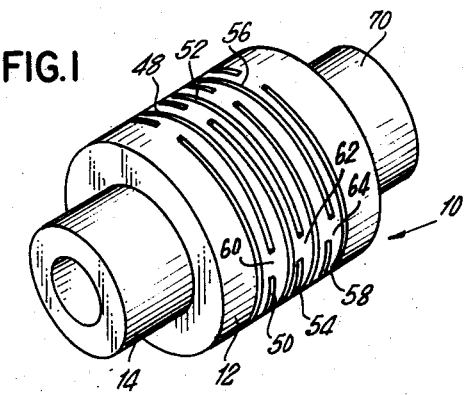
FIG. 1 is a perspective view of a flexible coupling constructed in accordance with the concepts of the present invention.
Figure 3:
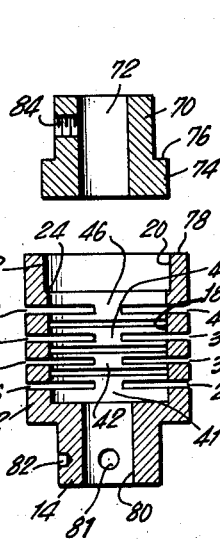
FIG. 3 is an exploded longitudinal sectional view of the flexible coupling.

With continuing reference to the accompanying drawing wherein like reference numerals designate similar parts throughout the various views, reference numeral 10 is used to designate the precision flexible instrument coupling manufactured in accordance with the invention which includes a cylindrical body 12 formed of tempered beryllium copper, though it is within the concept of this invention to construct the body of stainless steel, Phosphor bronze, aluminum alloys, and other suitable metals and alloys thereof. The body 12 has a hub 14 integrally formed therewith, which hub is of a reduced diameter and which is provided with a bore 16. Drilled in the body 12 is a bore 18 of larger diameter than the bore 16 and there is also drilled in the body 12 a hole 20 of larger diameter than the bore 18 which forms an offset portion 22 and a shoulder 24. The offset portion 22 is at the opposite end of the body 12 from that of the hub 14.

Cut in the body 12 are a series of pairs of slots 26, 28; 30, 32; 34, 36; and 38, 40. These slots extend throughout almost 180° leaving only pairs of ribs 40, 42, 44 and 46 therebetween. A second series of slots 48, 50; 52, 54; and 56, 58 which are alternately arranged with respect to the first series of slots and are also arranged in pairs, are disposed equidistantly between the respective pairs of slots 26, 28; 30, 32; 34, 36; and 38, 40 and defines therebetween pairs of web portions 60, 62, and 64.

Each of the pairs of slots 48, 50; 52, 54; and 56, 58 are also of approximately 180° and these slots are offset with respect to the slots 26 through 40 through an angle of 90° to thus form a series of blades.

The second hub 70 of the coupling is formed separately from the body 12 and is provided with a bore 72 which may be of the same size as the bore 16. A flange 74 is provided on the hub 70 for seating within the offset portion 22 and against the shoulder 24 with the surface 76 of the flange lined flush with the surface 78 of the body 12.

The hub 14 is provided with a bore 80 therethrough and a threaded aperture 81 is formed in the hub normal to the bore 80 so that when a shaft is disposed within the bore a set screw may be used to lock the shaft in place. A partially drilled hole 82 for handling as is desired may be provided.

A threaded aperture 84 is also provided in the hub 70 normal to the bore 72 and communicating therewith for reception of another set screw for holding another shaft in place when inserted in the bore 72. The bore 72 and the bore 80 are carefully aligned in an extremely accurate manner and may be formed or re-machined after assembly of the hub 70 to the body 12 if desired.

Figure 2:
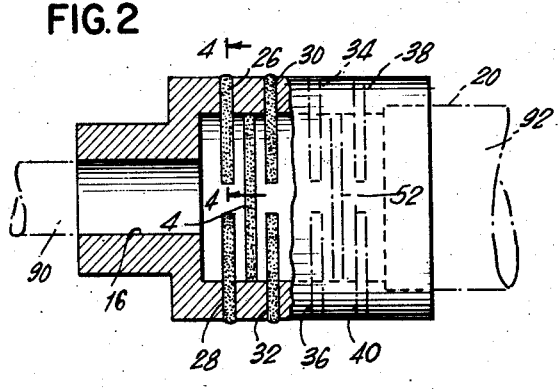
FIG. 2 is an elevational view illustrating a step in manufacture of the flexible coupling, with parts being broken away to show other parts in detail.
Figure 4:
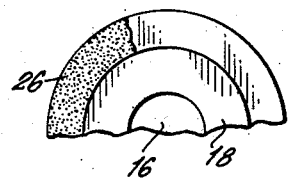
FIG. 4 is a partial sectional view taken along the plane of line 4—4 in FIG. 2.

The flexible coupling 10 is formed in accordance with a process wherein the bore 18 is first drilled in the body 12. Then, the undercut portion 22 is formed by drilling the opening 20 which is of larger diameter than the bore 18. As shown in FIG. 2, mandrels of different sizes and indicated at 90 and 92 respectively are inserted in the bore 16 and in the undercut portion 20 to grasp the body in a secure manner. Then, using a tool having a gang of three blades the slots 26, 30 and 34 are cut in the body. Subsequently, these slots are then filled with a suitable low melting point material. It has been found that sealing wax serves best of all materials inasmuch as there is substantially no distortion of the body when such material is used. However, low melting point alloys of various metals such as bismuth, antimony, lead, and the like can be used.

After the sealing wax has been disposed in the slots 26, 30 and 34 the workpiece is rotated or the tool is moved so that slots 28, 32 and 36 can then be cut. These slots are then filled with a low melting point material such as sealing wax and the tool is moved relative to the work piece or vice versa so that the cutting action of the tool will form the slot 40 while the blades pass into the slots 36 and 32. All the slots made in the body are successively filled with sealing wax and after the slot 40 is cut, the slot 38 is then cut with the blades passing into the already cut slots 30 and 34.

Alternatively, after the slots 26, 30 and 34 have been cut, slot 36 can be cut with the blades passing into the slots 34 and 30 and subsequent to the slots 38, 32 and 36 being cut, slot 40 may be cut.

After sealing wax has been disposed in all of the slots 26 through 40, slots 48, 52 and 56 may be cut and with sealing wax disposed therein, slots 50, 54 and 58 are cut. Then, the hub 70 is pressed into the body 12 with the flange 74 engaging the shoulder 24 and the undercut portion 20 and with the surface 76 of the flange lying flush with the surface 78 of the body. A low melting point of solder is applied to this joint. Subsequently, the assembled coupling which has slots thereof filled with sealing wax is passed into a zone of heat and heated, whereby the sealing wax will be melted out and whereby the solder which has been applied to the joint will be more evenly distributed and effects a substantially perfect seal between the hub 70 and the body 12.

After the sealing wax has been removed, the bores 72 and 16 can be tested for exact concentricity within a tolerance of .001 inch with the hub bore diameter within a tolerance of .0003 inch.

A suitable finish can be electroplated or the coupling can be lacquer coated as desired.

Figure 5:
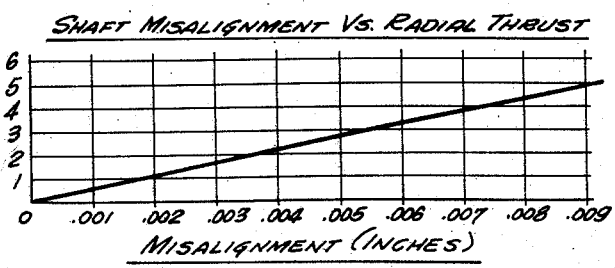
FIG. 5 is a graph illustrating an important coupling characteristic of the invention.

An unusual coupling characteristic of this flexible coupling is apparent from an inspection of FIG. 5 wherein it is noted that the radial thrust measured in pounds is directly proportional to the shaft misalignment measured in inches of the shafts received in the bores 16 and 72. Further, even at approximately .01 inch of shaft misalignment the radial thrust will be under 6 lbs. and such force will cause no undue stress on shafts, ball bearing, gearings or other rotating components which allows this type of flexible coupling to be used in the most exacting application such as missile control instrumentation and the like. Further, it is to be noted that the angle of twist of this coupling results in an applied torque which is also directly proportional thereto within the elastic limits of this flexible coupling.

While preferred embodiments of the invention have been shown and described herein, it is obvious that numerous additions, changes and omissions may be made in such embodiments without departing from the spirit and scope of the invention.

What I claim is:

A flexible coupling comprising a cylindrical body having a first hub of reduced diameter integrally formed therewith and projecting from one end of said body, said body having a bore therein, said body being provided with a cut-out portion of larger diameter than said bore forming a shoulder in said body, a second hub secured to the other end of said body and projecting in an opposite direction from said first hub, said second hub being provided with a flange and being disposed in said cut-out portion with one side of said flange engaging said shoulder, the other side of said flange lying flush with the other end of said body, said hubs each having a bore therethrough of lesser diameter than the bore in said body, said body having a plurality of longitudinally spaced slots therein, said slots being arranged in equally spaced complementary oppositely disposed pairs, adjacent pairs of slots being radially offset from each other through an angle of ninety degrees, said slots extending normal to the longitudinal axis of said body.

References Cited in the file of this patent

UNITED STATES PATENTS

| | | |
|---|---|---|
| 326,941 | Browne | Sept. 29, 1885 |
| 1,459,035 | Raisig | June 19, 1923 |
| 1,557,958 | Anderson | Oct. 20, 1925 |
| 1,573,197 | Schuette | Feb. 16, 1926 |
| 2,628,417 | Peyches | Feb. 17, 1953 |
| 2,778,209 | Wilson | Jan. 22, 1957 |
| 2,824,434 | Stern | Feb. 25, 1958 |
| 2,891,307 | Betteridge | June 23, 1959 |

FOREIGN PATENTS

| | | |
|---|---|---|
| 352,392 | Germany | June 8, 1920 |